F. S. NURY
J. E. BREKKE
*INVENTORS.*

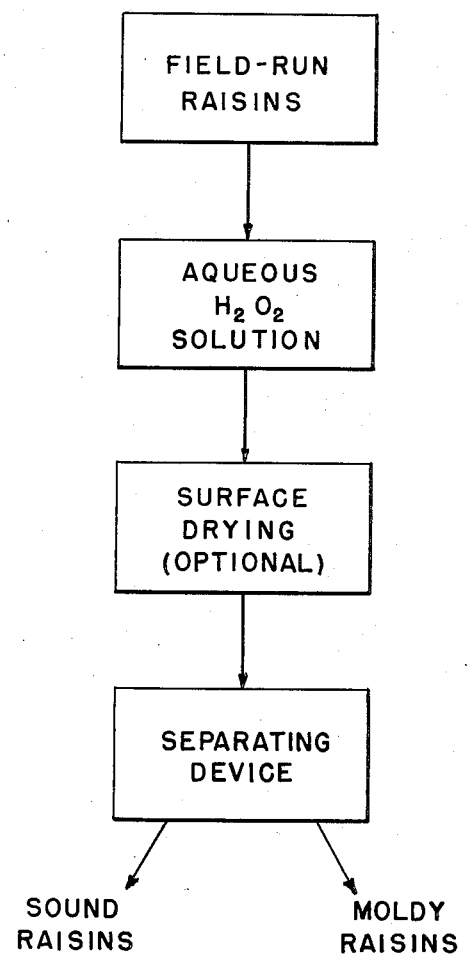
FIG. 2
FIG. 3
FIG. 1
F. S. NURY
J. E. BREKKE
INVENTORS.

BY
*ATTORNEY.*

United States Patent Office 2,966,988
Patented Jan. 3, 1961

2,966,988

APPARATUS AND PROCESS FOR SORTING RAISINS

Fredoon S. Nury, Oakland, and John E. Brekke, Berkeley, Calif., assignors to the United States of America as represented by the Secretary of Agriculture Filed Mar. 24, 1959, Ser. No. 801,680

10 Claims. (Cl. 209—2)

A non-exclusive, irrevocable, royalty-free license in the invention herein described, throughout the world for all purposes of the United States Government, with the power to grant sublicenses for such purposes, is hereby granted to the Government of the United States of America.

This invention relates to the sorting raisings. Particular objects of the invention are the provision of apparatus for separating particles according to the different adherence properties of individual particles and process for separating moldy from sound raisins. Further objects and advantages of the invention will be evident from the following description taken in connection with the annexed drawing wherein like numerals indicate like parts.

Figure 4:
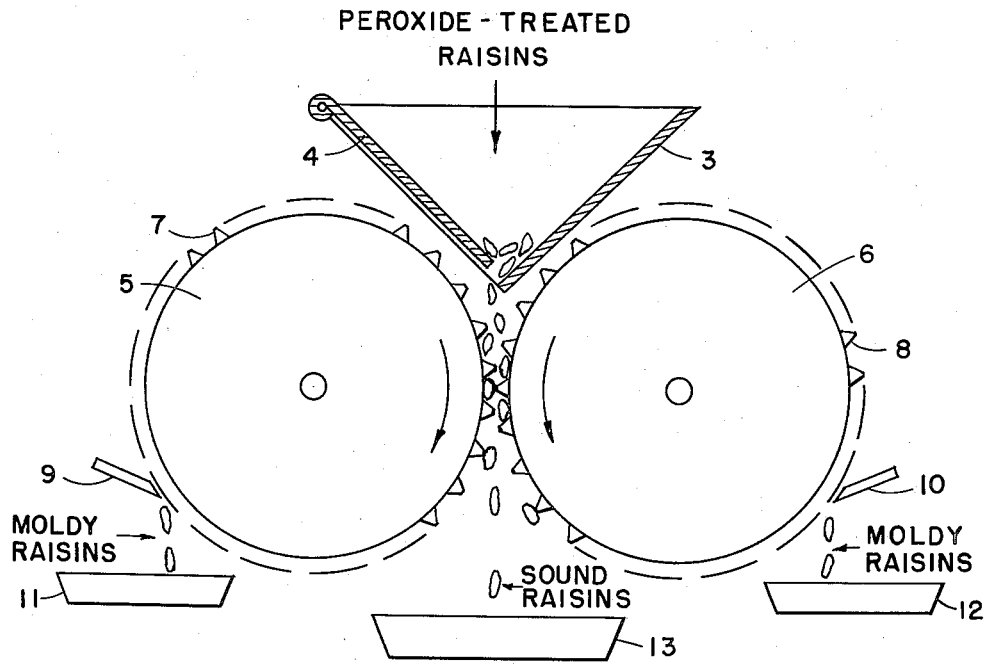
Figure 5:
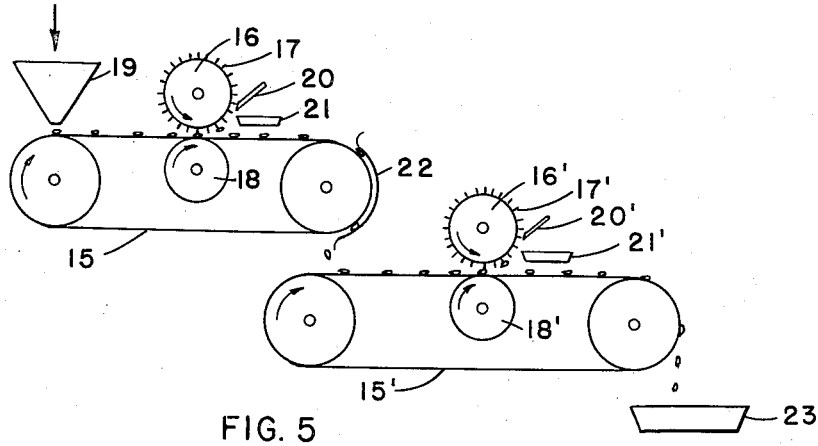

In the drawing, Fig. 1 depicts a flow sheet of the process of the invention. Figs. 2 and 3 depict, respectively, a sound raisin and a moldy one after treatment with hydrogen peroxide. Figs. 4 and 5 illustrate two forms of apparatus suitable for sorting raisins in accordance with the invention.

In the production of raisins, it is conventional to remove the bunches of grapes from the vines and lay them out in the field where they are exposed to the sun. The grapes are thus dried by natural means forming the product known as raisins. This natural or sun-drying procedure produces an entirely satisfactory product provided there is no rain during the drying period. If it rains, mold develops on the raisins, particularly those which were in such positions that moisture could not evaporate readily. The product thus will contain sound raisins plus moldy raisins. Such a product commands a greatly reduced price as compared to a product containing only sound, mold-free raisins. In general, where the raisins contain a substantial proportion of moldy fruit (over about 4%) the product cannot be sold on the regular market but must be diverted to use for preparing spirits. Sale for such use brings only a fraction of the regular price.

This problem has confronted the industry for a long time and various techniques have been advocated for sorting the raisins to segregate the moldy from the sound fruit. However, prior methods have not proved feasible as yielding ineffective sorting or as involving prohibitive costs.

The problem of sorting raisins is particularly difficult because the moldy and sound fruit exhibit at most very minor differences. Thus the moldy fruit retains the size, shape, color, taste, density, and texture of the sound fruit. In appearance there is this distinction that the moldy fruit has deposits of mold on the surface. However casual examination may result in confusing such mold colonies with normal sugar deposits of dirt. Generally, careful examination of the fruit is required for accurate detection of moldy areas, particularly where they are small.

The process of the invention offers a relatively inexsive, yet effective method of separating moldy from sound raisins despite the fact that the two types of fruit exhibit such slight outward differences. The process of the invention is best explained by reference to the annexed drawing.

Referring now to Fig. 1, the first step in the process involves treating the raisins to be sorted with an aqueous solution of hydrogen peroxide. To this end, the raisins in the form of individual fruit, that is, de clustered and preferably free from stems and other debris, are fed into a tank containing an aqueous solution of hydrogen peroxide. The raisins are immersed in this solution until the moldy fruit develops spongy formations in areas where there is mold growth. In this treatment the sound fruit retains its normal appearance and properties.

Next the peroxide-treated raisins are subjected to a current of air to blow off excess solution and effect a superficial (surface) drying. In the alternative, the raisins may be drained on a sieve or grill. However, neither the surface air drying nor draining is essential and may be omitted.

The peroxide-treated raisins are then subjected to treatment to separate the moldy from the sound raisins. The procedure employed involves a segregation based on the difference in adherent properties between the moldy raisins and the sound ones, this difference having been developed by the preceding peroxide treatment. After the separating operation, the moldy and sound fractions may be sprayed with water and dried in conventional manner to remove the moisture added during the peroxide treatment. Any hydrogen peroxide remaining in the fruit tissue will decompose spontaneously when the fruit is stored leaving no harmful residue.

As noted above, the separation of the peroxide-treated moldy and sound raisins take advantage of the difference in adherent properties exhibited by the two types of raisins. This difference is developed by the peroxide treatment; it is not present in the untreated raisins. Thus if a batch of untreated raisins is examined it will be found that there is no difference in adherent properties between the moldy and sound ones. However, the peroxide treatment completely changes this picture. That is, it develops spongy formations in areas where there is mold growth without altering sound tissue. These spongy formations are quite soft in comparison to the normal tissue. Also these spongy formations may be termed pressure sensitive. Thus, for example, if the raisins are spread on a surface such as a table and the end of a pencil or any other rod-like element is pressed lighty against the spong formation of one of the raisins, then lifted away, the raisin in question will preferentially adhere to the element and will be lifted with it. Such effect is not observed where the element is pressed against the sound peroxide-treated fruit. In such case there is no adherence, no pressure sensitive effect. Under these circumstances, the segregation can be accomplished very readily. For example the peroxide-treated raisins may be separated manually by spreading them on a surface and pressing against them a comb or other device having blunt-tipped protuberant elements. Only the moldy fruit will adhere to the elements. After removal of the adhered fruit from the device the process is repeated until only the sound fruit remain. Although such manual operation can be employed it is obviously preferable to employ power-operated apparatus which essentially duplicates such action. Basically, the apparatus should provide a backing member, or surface, a body provided with a plurality of blunt-tipped protuberant elements, and means for successively engaging raisins between the backing surface and the tips of the protuberant elements. The moldy raisins having greater adherence properties than the sound raisins will accordingly adhere to the tips of the protuberant elements whereas the sound raisins will pass through the apparatus since they do not exhibit the pressure-sensitive effect. The protuberant elements are preferably positioned on a rotatable body such as a cylinder whereby the apparatus can be applied for continuous separation of a stream of raisins. Different forms of apparatus for accomplishing the desired action are depicted in the drawing, Figs. 4 and 5, and explained below.

The peculiar effect of the hydrogen peroxide may be explained as follows: When the raisins are contacted with hydrogen peroxide, this compound penetrates through the pellicle or skin into the raisin tissue. In the event that this tissue is in mold-free condition, no changes occur as regards matters of concern to the invention. However, where there is mold growth, the hydrogen peroxide is rapidly decomposed liberating oxygen in accordance with the equation $$2H_2O_2 = 2H_2O + O_2$$

This reaction is catalyzed by the presence of the enzyme catalase which is elaborated by the mold organisms. (Normal raisin tissue is essentially free from this enzyme.) The liberated oxygen is trapped in the tissue in the form of minute globules producing en masse with the surrounding tissues the aforesaid spongy formation. It is to be particularly noted that the spongy formation is consistently larger in area than would be expected from the original visible size of the mold growth. In typical cases external mold growths covering areas not much bigger than a pinhead will, after peroxide treatment, yield spongy formations having an area on the order of 6 to 50 sq. mm. Since mold growth generally occurs at several points on the raisin surface, the resulting spongy formation will extend over a considerable proportion of the raisin surface. Referring now to the drawing, Fig. 2 depicts a sound raisin after peroxide treatment. As noted above, the fruit is the same in texture, color, and general appearance as the untreated fruit. Fig. 3 depicts a moldy raisin after peroxide treatment. The spongy area 1 is of a whitish color and contrasts with the normal brown of the sound tissue 2.

The peroxide treatment of the raisins involves nothing more than soaking the raisins in an aqueous solution of hydrogen peroxide. The concentration of hydrogen peroxide may be varied: for example about from 2 to 15%, perferably 6 to 10%, by weight of $H_2O_2$. The time required to develop the spongy formations will generally be shorter as the concentration of $H_2O_2$ is increased. For example at a concentration of 7.5%, about 10 minutes soaking is used; at a concentration of 5%, about 13–15 minutes of soaking is used. In any particular case one can easily tell when the raisins are ready for further processing by simply lifting them out of the solution and observing them. If the spongy formations are not yet formed, the raisins are allowed to soak a while longer and re-examined. The peroxide solution is ordinarily prepared by mixing a commercial solution of hydrogen peroxide with water to establish the desired concentration. If desired however the peroxide may be produced in situ by dissolving in water, sodium peroxide and the calculated amount of a non-toxic acid, such as hydrochloric, sulphuric, phosphoric, etc., as required by stoichiometry.

Reference is now made to Fig. 4 which illustrates apparatus which may be used to sort the peroxide-treated raisins or any other particles having different adherence properties. The apparatus includes hopper 3, provided with adjustable gate 4, to feed the peroxide-treated raisins into the nip between co-acting cylindrical members 5 and 6. These cylindrical members are rotated at the same speed in the directions shown by conventional means (not illustrated).

Cylindrical members 5 and 6 are of identical construction and are studded with radial blunt-tipped protuberant elements in forms of rods 7 and 8, respectively. (To simplify the figure only a representative number of elements are shown; it is understood however that they are provided about the entire periphery of each cylindrical member.) These elements are blunt-tipped to avoid pricking the skins of the raisins and may be made of metal, rubber, neoprene, polyethylene, wood, or the like. The blunt ends of the elements have a relatively small cross-sectional area, on the order of 0.3 to 6 sq. mm. As is evident in the drawing, the elements of one cylindrical member are staggered with respect to those of the other cylindrical member so that the respective elements 7 and 8 mesh with one another at the point of minimum distance between the cylindrical members. The elements are proportioned so that even at the point of minimum distance between the cylindrical members a space remains between the tips of the elements of one cylindrical member and the surface of the other cylindrical member. This space is utilized as explained below for the successive pressing of raisins and eventual selection depending on their adherent properties.

In operation of the apparatus, as the raisins are fed between the cylindrical members 5 and 6 they are received in the spaces between adjacent elements 7 and between adjacent elements 8. Then as the rotation continues each raisin is individually pressed between the surface of one cylindrical member and the co-acting element on the other cylindrical member. For example raisins lodged between elements 7 will be pressed between the surface of cylindrical member 5 and the blunt-tipped end of elements 8 projecting from cylindrical member 6. Similar action will take place regarding those raisins lodged between elements 8. By this repetitive action, the raisins which have spongy formations (i.e., moldy ones) will preferentially cling to the elements against which they are pressed and will be carried out of the main stream. The separated raisins are dislodged from elements 7 and 8 by scrapers 9 and 10, respectively, and fall accordingly into hoppers 11 or 12. Sound raisins will not cling to the elements but will drop out of the spaces between adjacent elements and continue downward to be received in hopper 13.

Conventional positioning mechanism (not illustrated) is provided to adjust the distance between cylindrical members 5 and 6 so that the raisins are subjected to a small degree of pressure by the ends of elements 7 against the surface of cylindrical member 6 (and by the ends of elements 8 against the surface of cylindrical member 5). As the device operates, its action may be observed and suitable adjustment of the spacing made as provides the best separation of the spongy raisins from the sound ones without any mashing or other damage to the fruit.

The apparatus of Fig. 5 includes an endless belt 15 looped about conventional rollers by which it is traversed in the direction shown.

Above belt 15 is located cylindrical member 16 which is rotated by conventional means in the direction shown. The surface of cylindrical member 16 is studded with blunt-tipped protuberant elements 17 (schematically illustrated) similar to elements 7 and 8 in the modification of Fig. 4. Cylindrical member 16 positioned above belt 15 such a distance that raisins are pressed lightly between the tips of elements 17 and the surface of belt 15. A backing roller 18 is positioned beneath the belt to maintain it in alignment. Conventional positioning means may be provided to adjust the position of cylindrical member 16 or roller 18 to obtain the desired degree of pressure to be exerted on the raisins by the tips of elements 17 whereby to attain a selection effect without damaging the raisins.

The peroxide-treated raisins are fed onto belt 15 from hopper 19. The raisins are thus carried under cylindrical member 16 whereby they are contacted by elements 17. The moldy raisins cling to the tips of elements 17 exactly as described in connection with the modification of Fig. 4 and are thus removed from the belt. The adhering raisins are dislodged from elements 17 by scraper 20 and collected in hopper 21.

The raisins which do not adhere to elements 17 proceed to the end of belt 15 and are then transferred to counterpart belt 15'. An arcuate guide 22 is provided so that as the transfer is made the raisins will, in general, present their opposite faces to belt 15', as compared to their former position on belt 15. In other words, a turning over of the raisins is achieved. On belt 15', the raisins are subjected to a second sorting operation by elements 16', 17', 18', 20', and 21' which act exactly as their counterparts 16, 17, 18, 20, and 21. The sound raisins which are not picked off the belt in this second sorting operation are discharged into hopper 23.

The principles of the apparatus of Fig. 5 may be extended by providing as many sets of tongued cylindrical member and cooperating mechanisms as desired to obtain the desired degree of fractionation.

Having thus described the invention, what is claimed is:

1. A process of separating moldy raisins from a lot of raisins containing moldy raisins and sound raisins which comprises immersing the lot of raisins in an aqueous solution of hydrogen peroxide until the moldy raisins develop sponginess, removing the raisins from the solution, and segregating the moldy and sound raisins by means selectively responsive to the difference in adherence properties of the moldy and sound raisins.

2. A process of separating moldy raisins from a lot of raisins containing moldy raisins and sound raisins which comprises immersing the lot of raisins in an aqueous solution of hydrogen peroxide until the moldy raisins develop sponginess, removing the raisins from the solution, and segregating the moldy and sound raisins by means selectively responsive to the difference in adherence properties of the moldy and sound raisins, said means including rod-like elements which are successively pressed endwise against the raisins and withdrawn therefrom.

3. A process of separating moldy raisins from a lot of raisins containing moldy raisins and sound raisins which comprises soaking the lot of raisins in an aqueous solution of hydrogen peroxide until the moldy raisins develop spongy formations in the areas of mold growth, removing the raisins from the said solution, pressing against the raisins a plurality of rod-like elements in endwise presentation whereby to selectively adhere the moldy raisins to the ends of the said elements, withdrawing said elements, and removing the adhering moldy raisins therefrom.

4. An apparatus for segregating particles according to the different adherence properties of individual particles which comprises a backing member, a body provided with blunt-tipped protuberant rods, means for feeding the particles of differing adherence properties between said backing member and the tips of the protuberant rods, means for successively engaging the particles between the backing member and the tips of the protuberance rods, the tips of the protuberant rods being spaced from the backing member such distance that the particles are subjected to a degree of pressure by the tips of the protuberant rods without mashing the particles, whereby the more adherent particles adhere to said tips, and means for dislodging from the tips of the protuberant rods those particles which selectively adhere thereto.

5. An apparatus for segregating particles according to the different adherence properties of the individual particles which comprises a backing member, a rotatable member provided with blunt-tipped protuberant rods, said backing member and rotatable member being spaced to provide a selection zone between the backing member and the tips of the protuberant rods, means for feeding the particles of different adherence properties into said zone, means for rotating said rotatable member, the tips of the protuberant rods being spaced from the backing member such distance that the particles are subjected to a degree of pressure by the tips of the protuberant rods without mashing the particles, whereby the more adherent particles adhere to said tips, and means for dislodging from the tips of the protuberant rods those particles which selectively adhere thereto.

6. An apparatus for separating particles according to the different adherence properties of the individual particles which comprises a backing member, an opposed cylindrical member provided with radial blunt-tipped protuberant rods, means for rotating said cylindrical member, said members being positioned to define a space between the surface of the backing member and the opposing tips of the protuberant rods for successive engagement of particles therebetween as the cylindrical member is rotated, means for feeding the particles of different adherence properties into said space, the tips of the protuberant rods being spaced from the backing member such distance that the particles are subjected to a degree of pressure by the tips of the protuberant rods without mashing the particles, whereby the more adherent particles adhere to said tips, and means for dislodging from the tips of the protuberant rods those particles which selectively adhere thereto.

7. An apparatus for selecting the more adherent individual particles from a stream of particles having different adherent properties moving in a predetermined stream which comprises a backing member disposed on one side of the stream of particles, a plurality of blunt-tipped protuberant rods disposed in cooperative relation with the backing member on the other side of said stream, means for successively engaging the individual particles of different adherent properties between said backing member and the tips of said protuberant rods, the tips of the protuberant rods being spaced from the backing member such distance that the particles are subjected to a degree of pressure by the tips of the protuberant rods without mashing the particles, whereby the more adherent particles adhere to the said tips, and means for dislodging the adhering particles from the tips of the protuberant rods.

8. An apparatus for selecting the more adherent individual particles from a stream of particles having different adherent properties moving in a predetermined stream which comprises a backing member disposed on one side of the stream, a cylindrical member provided with a plurality of radial blunt-tipped protuberant rods disposed in cooperative particle-engaging relationship with the said backing member on the other side of said stream, means for rotating the said cylindrical member in the direction in which the particles are moving to successively engage the individual particles of different adherent properties between the backing member and the tips of the protuberant rods, the tips of the protuberant rods being spaced from the backing member such distance that the particles are subjected to a degree of pressure by the tips of the protuberant rods without mashing the particles, whereby the more adherent particles adhere to said tips, and means for dislodging the adhering particles from the tips of the protuberant rods.

9. An apparatus for segregating particles according to the different adherence properties of the individual particles which comprises a pair of opposed rotatable cylindrical members each provided with radial blunt-tipped protuberant rods, means for rotating the cylindrical members, the cylindrical members being spaced apart a predetermined distance to provide a space between the opposing surface of one cylindrical member and the tips of the protuberant rods of the other, said space serving for successive selection of particles therein as the cylindrical members rotate, means for feeding the particles of different adherent properites between said cylindrical members, the space between the opposing surface of one cylindrical member and the tips of the protuberant rods of the other being such that the particles are subjected to a degree of pressure by the tips of the protuberant rods without mashing the particles, whereby the more adherent particles adhere to said tips, and means for dislodging from the tips of the protuberant rods those particles which selectively adhere thereto.

10. An apparatus for segregating particles according to the different adherence properties of individual particles which comprises a pair of rotatable cylindrical members in parallel relationship, each cylindrical member being provided with radial blunt-tipped protuberant rods, means for rotating the cylindrical members in opposite directions, the cylindrical members being positioned such a distance apart that as the cylindrical members converge toward one another the rods of the one cylindrical member intermesh with those of the other cylindrical member while providing a space between the tips of the rods of one cylindrical member and the opposing surface of the other cylindrical member, said space serving for successive selection of particles therein as the cylindrical members rotate, means for feeding the particles of different adherent properties between said cylindrical members, the space between the opposing surface of one cylindrical member and tips of the protuberant rods of the other being such that the particles are subjected to a degree of pressure by the tips of the protuberant rods without mashing the particle, whereby the more adherent particles adhere to said tips, and means for dislodging from the tips of the protuberant rods the particles which selectively adhere thereto.

References Cited in the file of this patent

UNITED STATES PATENTS

| | | |
|---|---|---|
| 396,678 | Ayers | Jan. 22, 1889 |
| 1,584,869 | Ladd | May 18, 1926 |
| 1,594,702 | Williams | Aug. 3, 1926 |
| 1,802,294 | Walker | Apr. 21, 1931 |
| 2,291,447 | Bierbrauer | July 28, 1942 |
| 2,578,540 | Gundlach | Dec. 11, 1951 |